(12) United States Patent
Li

(10) Patent No.: US 11,409,150 B2
(45) Date of Patent: Aug. 9, 2022

(54) DISPLAY DEVICE AND SHOOTING METHOD OF DISPLAY DEVICE

(71) Applicant: Wuhan China Star Optoelectronics Technology Co., Ltd., Wuhan (CN)

(72) Inventor: Shaokun Li, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 190 days.

(21) Appl. No.: 16/753,815

(22) PCT Filed: Nov. 11, 2019

(86) PCT No.: PCT/CN2019/117067
§ 371 (c)(1),
(2) Date: Apr. 6, 2020

(87) PCT Pub. No.: WO2021/027127
PCT Pub. Date: Feb. 8, 2021

(65) Prior Publication Data
US 2021/0405415 A1 Dec. 30, 2021

(30) Foreign Application Priority Data

Aug. 13, 2019 (CN) .......................... 201910744105.0

(51) Int. Cl.
G02F 1/1333 (2006.01)
G02F 1/163 (2006.01)
G06F 1/16 (2006.01)

(52) U.S. Cl.
CPC .......... *G02F 1/13338* (2013.01); *G02F 1/163* (2013.01); *G06F 1/1686* (2013.01)

(58) Field of Classification Search
CPC ..... G02F 1/13338; G02F 1/163; G06F 1/1686
USPC .......................................................... 349/56
See application file for complete search history.

(56) References Cited

U.S. PATENT DOCUMENTS

2020/0064686 A1* 2/2020 Jiang ................. G02F 1/133617
2020/0341306 A1* 10/2020 Shi .................... G02F 1/133528

FOREIGN PATENT DOCUMENTS

| CN | 108922900 | 11/2018 |
|---|---|---|
| CN | 109031762 | 12/2018 |
| CN | 109188824 | 1/2019 |
| CN | 109688308 | 4/2019 |
| CN | 109870840 | 6/2019 |
| KR | 10-2008-0041853 | 5/2008 |

\* cited by examiner

*Primary Examiner* — Nathanael R Briggs
*Assistant Examiner* — William D Peterson

(57) ABSTRACT

The present application provides a display device. When a camera assembly of the present application is switched to a camera mode, a light valve is in a light-shielding state, and pixel units in a light transmissive region are in a light transmissive state. A photosensitive element collects external image information through the light transmissive region for imaging. When the camera mode of the camera assembly is switched off, the light valve is in a light-transmissive state, and light of the backlight module passes through the light valve to perform normal display operations. Accordingly, camera-under-panel shooting and a full-screen design are realized, and a bezel problem of a display panel is completely solved.

10 Claims, 2 Drawing Sheets

DISPLAY DEVICE AND SHOOTING METHOD OF DISPLAY DEVICE

RELATED APPLICATIONS

This application is a National Phase of PCT Patent Application No. PCT/CN2019/117067 having International filing date of Nov. 11, 2019, which claims the benefit of priority of Chinese of Patent Application No. 201910744105.0 filed on Aug. 13, 2019. The contents of the above applications are all incorporated by reference as if fully set forth herein in their entirety.

FIELD AND BACKGROUND OF THE DISCLOSURE

The present invention relates to a field of display devices and in particular, to a display device and a shooting method of a display device.

With the development of mobile phones, full screens have gradually become a development trend. Full screen products bring better visual experiences and provide interference-free display functions.

At present, a method for realizing a full-screen display panel includes designing a blind hole and a peripheral driving circuit. The peripheral driving circuit can make edges of a non-display region narrower and smaller. The blind hole design is a cutting design in the display panel, and a camera hole position is reserved in a display region. However, designing the blind hole and the peripheral driving circuit cannot fully realize the full-screen design, so cannot solve a problem about a bezel width of the display panel and also cannot perfect the aesthetics of the display region.

Therefore, there is a need to design a display device and a shooting method of the display device to solve the bezel width problem of the display panel and the aesthetic problem of the display region in conventional techniques.

SUMMARY OF THE INVENTION

It is an objective of the present application to provide a display device and a shooting method of the display device to solve a bezel width problem of the display panel and improve the aesthetics of a display region in conventional techniques.

Accordingly, the present application provides a display device, comprising:

a liquid crystal display (LCD) panel;

a backlight module disposed in back of the LCD panel; and a camera assembly disposed between the LCD panel and the backlight module.

The LCD panel is provided with a light transmissive region, the camera assembly is disposed corresponding to the light transmissive region, the camera assembly comprises a photosensitive element and a light valve, and the light valve is disposed adjacent to the backlight module.

The light valve comprises a glass substrate and an electrochromic material in the glass substrate, the electrochromic material is one or a combination of indium tin oxide and tungsten trioxide for controlling switching-on or switching-off of the light valve.

A control terminal is connected to the light valve, and the control terminal sends an electrical signal to the light valve or disconnects the light valve from an electrical signal; when the camera assembly is switched to a camera mode, the light valve is in a light-shielding state, and light of the backlight module is stopped from passing through the light valve; when the camera mode of the camera assembly is switched off, the light valve is in a light-transmissive state, and the light of the backlight module passes through the light valve to provide a backlight source for the light transmissive region.

The light transmissive region comprises a plurality of pixel units arranged in an array. When the camera assembly is switched to a camera mode, the pixel units in the light transmissive region are in a light-transmissive state, and the photosensitive element collects external image information through the light transmissive region. When the camera mode of the camera assembly is switched off, the pixel units are lit by a backlight source to return to a normal display mode.

A size of each pixel unit in the light transmissive region is smaller than a size of each pixel unit outside the light transmissive region, and a gap between the pixel units in the light transmissive region is larger than a gap between the pixel units outside the light transmissive region.

A projection of the camera assembly projected on the light transmissive region is located in the light transmissive region.

Accordingly, the present application further provides a shooting method of a display device, comprising following steps:

step S1: forming a light transmissive region in a liquid crystal display (LCD) panel, wherein a plurality of pixel units are arranged in the light transmissive region, and the pixel units are connected to a driving circuit;

step S2: setting a camera assembly between the LCD panel and a backlight module, wherein the camera assembly is arranged corresponding to the light transmissive region, the camera assembly comprises a photosensitive element and a light valve, and a control terminal is connected to the light valve; and step S3: switching on a camera mode of the camera assembly, the control terminal, and the driving circuit, and using the photosensitive element for photosensitive imaging; switching off the camera mode of the camera assembly, the control terminal, and the driving circuit, and using the display panel to perform normal display operations.

In step S1 of forming the light transmissive region in the LCD panel, wherein the light transmissive region is provided with the pixel units, and the pixel units are connected to the driving circuit, the shooting method further comprises:

switching on the driving circuit, so a plurality of liquid crystals in the pixel units allow entry of external light; and switching off the driving circuit, so the liquid crystals in the pixel units stops entry of the external light.

In step S2 of setting the camera assembly between the LCD panel and the backlight module, wherein the camera assembly is arranged corresponding to the light transmissive region, the camera assembly comprises the photosensitive element and the light valve, and the control terminal is connected to the light valve, the shooting method further comprises:

switching on the control terminal, so the light valve receives an electrical signal to immediately change reflectance, absorption, and color to stop light from passing through the light valve;

switching off the control terminal, so the light valve is disconnected from an electrical signal, and the light valve returns to a transparent state to allow light to pass through the light valve.

In step S3 of switching on the camera mode of the camera assembly, the control terminal, and the driving terminal, and using the photosensitive element for photosensitive imaging; switching off the camera mode of the camera assembly, the control terminal, and the driving circuit, and using the display panel to perform the normal display operations, the shooting method further comprises:

switching on or off the camera mode of the camera assembly, the control terminal, and the driving circuit at the same time;

wherein when the camera assembly is switched to the camera mode, light of the backlight module is stopped from passing through the light valve, and an external light passes through the light transmissive region in the LCD panel and is transmitted to the photosensitive element for photosensitive imaging; and wherein when the camera mode of the camera module is switched off, the external light is stopped from passing through the light transmissive region in the LCD panel, and the light of the backlight module passes through the light valve and is transmitted to the display device for the normal display operations.

In the present application, a camera assembly is disposed between an LCD panel and a backlight module. The LCD panel is provided with a light transmissive region, the light transmissive region comprises a plurality of pixel units arranged in an array, the camera assembly is disposed corresponding to the light transmissive region, the camera assembly comprises a photosensitive element and a light valve, and the light valve is disposed adjacent to the backlight module. The control terminal is connected to the light valve, and the control terminal sends an electrical signal to the light valve or disconnects the light valve from an electrical signal. When the camera assembly is switched to a camera mode, the light valve is in a light-shielding state, light of the backlight module is stopped from passing through the light valve, the pixel units in the light transmissive region are in a light transmissive state, and the photosensitive element collects external image information through the light transmissive region for imaging. When the camera mode of the camera assembly is switched off, the light valve is in a light-transmissive state, light of the backlight module passes through the light valve to provide a backlight source for the light transmissive region, and the pixel units are lit by the backlight source to perform normal display operations. Accordingly, camera-under-panel shooting and a full-screen design are realized, and a bezel-width problem of the display panel is completely solved.

BRIEF DESCRIPTION OF THE SEVERAL VIEWS OF THE DRAWINGS

In order to more clearly illustrate the embodiments of the present disclosure or related art, figures which will be described in the embodiments are briefly introduced hereinafter. It is obvious that the drawings are merely for the purposes of illustrating some embodiments of the present disclosure, and a person having ordinary skill in this field can obtain other figures according to these figures without an inventive work.

DESCRIPTION OF SPECIFIC EMBODIMENTS OF THE INVENTION

The technical solutions of the embodiments of the present invention will be clearly and completely described below with reference to the accompanying drawings. It is apparent that the embodiments are only some embodiments of the present invention, and not all of the embodiments. All other embodiments obtained by those skilled in the art based on the embodiments of the present disclosure without an inventive step are deemed to be within the protection scope of the present invention.

The present application overcomes problems regarding a bezel width of a display panel and improves the aesthetics of a display region in conventional techniques.

Figure 1:
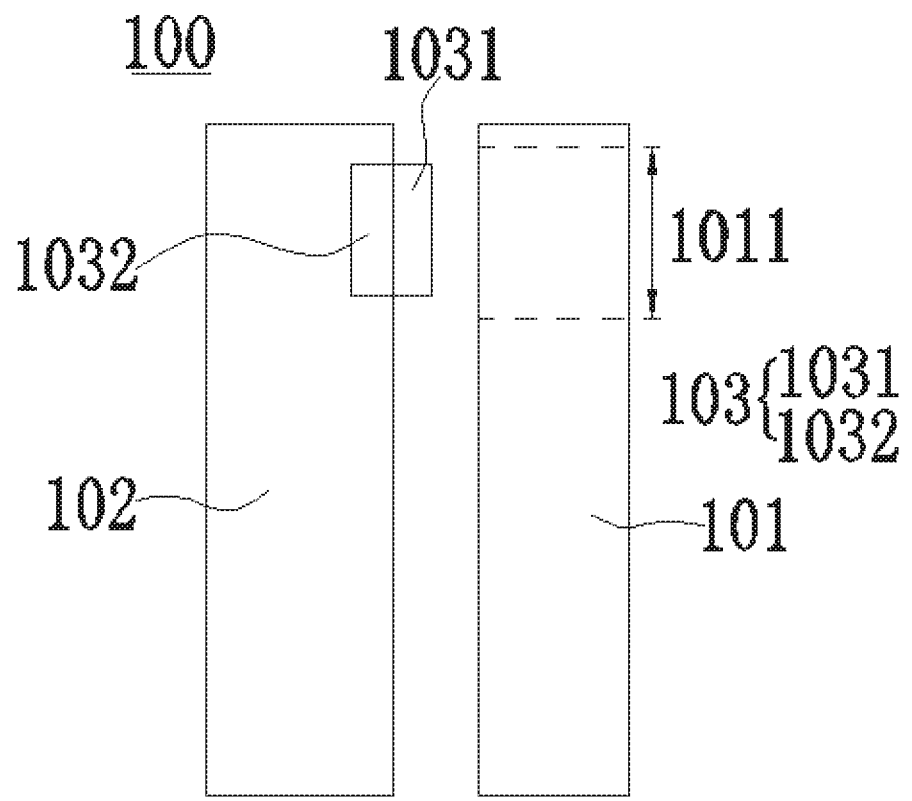
FIG. 1 is a schematic structural view illustrating a display panel according to one embodiment of the present application.

Referring to FIG. 1, the present application provides a display device 100. The display device 100 comprises a liquid crystal display (LCD) panel 101, a backlight module 102 disposed in back of the LCD panel 101, and a camera assembly 103 disposed between the LCD panel 101 and the backlight module 102. The LCD panel 101 is provided with a light transmissive region 1011, the camera assembly 103 is disposed corresponding to the light transmissive region 1011, the camera assembly 103 comprises a photosensitive element 1031 and a light valve 1032, and the light valve 1032 is disposed adjacent to the backlight module 102.

In detail, the LCD panel 101 is provided with the light transmissive region 1011. The light transmissive region 1011 comprises a plurality of pixel units arranged in an array. A size of each pixel unit in the light transmissive region 1011 is smaller than a size of each pixel unit outside the light transmissive region 1011, and a gap between the pixel units in the light transmissive region 1011 is larger than a gap between the pixel units outside the light transmissive region 1011, thereby facilitating light transmission. A surface area of the light transmissive region 1011 is greater than or equal to a surface area of the photosensitive element 1031. In other words, a projection of the camera assembly 103 projected on the light transmissive region 1011 is located in the light transmissive region 1011, so that the photosensitive element 1031 has a larger imaging area. The light transmissive region 1011 preferably has a shape of circle or a parallelogram shape with rounded corners.

The pixel unit in the light transmissive region 1011 comprises liquid crystals, a pixel electrode, and a color resist. The pixel units cooperate with the camera assembly 103 to shoot or not to shoot images. The pixel units are connected to an independent driving circuit for driving rotation of the liquid crystals in the pixel units. The driving circuit is a thin film transistor (TFT) matrix. When the camera assembly 103 is switched to a camera mode, the pixel units in the light transmissive region 1011 are in a light-transmissive state, and the photosensitive element 1031 collects external image information through the light transmissive region 1011. When the camera mode of the camera assembly 103 is switched off, the pixel units in the transmissive region 1011 are illuminated by light emitted from the backlight module 103 to return to a normal display mode. The driving circuit is connected to the pixel units in the light transmissive region 1011. The driving circuit is the TFT matrix for controlling rotation angles of the liquid crystals in the pixel units, thereby determining whether the liquid crystals in the pixel units are switched to an on/off state, and whether external light can pass through the light transmissive region 1011 through both sides of the display panel 101.

The camera assembly 103 is disposed in back of the display panel 101 and arranged corresponding to the light transmissive region 1011. The camera assembly 103 comprises the photosensitive element 1031 and the light valve 1032. The light valve 1032 comprises a glass substrate and an electrochromic material in the glass substrate. The electrochromic material is one or a combination of indium tin oxide and tungsten trioxide to control switching-on or switching-off of the light valve 1032. The light valve 1032 is connected to a control terminal, and the control terminal sends an electrical signal to the light valve 1032 or disconnects the light valve 1032 from an electrical signal. When the camera assembly 103 is switched to the camera mode, the light valve 1032 is in a light-shielding state, and light of the backlight module 102 is stopped from passing through the light valve 1032. When the camera mode of the camera assembly 103 is switched off, the light valve 1032 is in a light-transmissive state, and the light of the backlight module 102 passes through the light valve 1032 to provide a backlight source for the light transmissive region 1011.

The electrochromic material can be reversibly switched between transparent and opaque states. The optical properties of the electrochromic material can be reversibly transformed under certain conditions. The electrochromic material is quickly responsive to application of an electric field to change the electrochromic material's reflectance, transmittance, and absorption. The electrochromic material is used in an information context and for energy saving and buildings. The electrochromic material is used to make, for example, indium tin oxide conductive glass and tungsten trioxide color-changing glass. When a power circuit of the electrochromic material is electrically connected, the color-changing glass immediately changes the reflectance, absorption, and color, so that light cannot pass through this area. The electrochromic material has advantages as follows: changing colors rapidly, changing colors reversibly, high sensitivity to color changes, a long cycle life, a memorization function, and stable chemical properties. When a display panel screen using the electrochromic material is in a normal display mode, it has high transmittance, light from the backlight source can pass through the electrochromic glass and the photosensitive element and then pass through a display panel for displaying images normally. In a camera mode, light from an external object to be shot passes through a corresponding region in the display panel screen to achieve normal imaging on a photosensitive element, thereby realizing camera/shooting functions.

In the present embodiment, the light valve 1032 is embedded in the backlight module 102. The photosensitive element 1031 and the light valve 1032 share a control terminal. The control terminal is configured to switch on or off the camera mode of the camera assembly 103. A circuit of the light valve 1032 is connected to the control terminal. By controlling an ON/OFF state of the control terminal, it is determined whether the light valve 1032 allows light emitted from the backlight module 103 to pass through. The photosensitive element 1031 is disposed between the light valve 1031 and the light transmissive region 1011.

The photosensitive element 1031 has an imaging mode and a projecting mode. When the photosensitive element 1031 is in the imaging mode, the photosensitive element 1031 achieves photosensitive imaging through the light transmissive region 1011, and the light valve 1031 stops light of the backlight module 102 from passing through the light valve 1032. When the photosensitive element 1031 is in the projecting mode, the photosensitive element 1031 forms a projected image in the light transmissive region 1011, and the light valve 1031 allows light emitted from the backlight module 102 to pass through the light valve 1032. In the present embodiment, the camera assembly 103 further comprises an image sensor, a digital signal processor, and a logic power supply. The photosensitive element 1031 generates an optical image, projects it on a surface of the image sensor, and then converts the optical image into electrical signals. After ASD conversion, an image digital signal is obtained, which is then sent to the digital signal processor chip (DSP) for processing. Through a display screen, an image is displayed. In the present embodiment, the photosensitive element 1031 is disposed outside the display panel 101. In detail, the photosensitive element 1031 is disposed below the display panel 101, which is beneficial to realize a full screen design of the display panel 101 and completely solves a bezel problem of the display panel.

Figure 2:
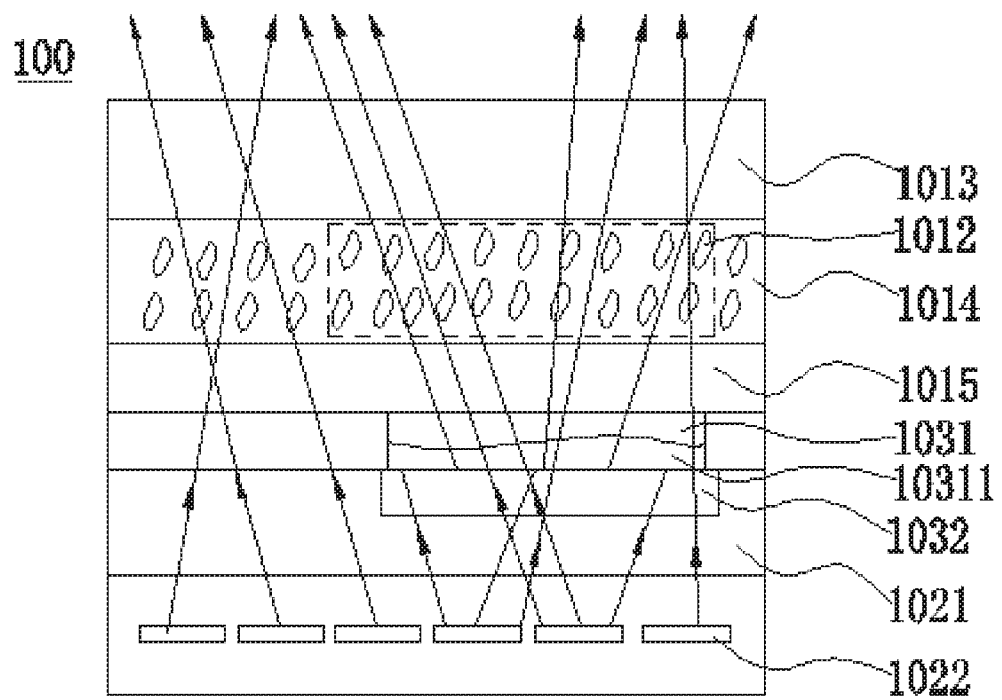
FIG. 2 is a schematic view illustrating light transmission of the display panel in a normal display mode according to one embodiment of the present application.

Referring to FIG. 2, it is a schematic view illustrating light transmission of a display device 100 in a normal display mode according to one embodiment of the present application. The display device 100 comprises a liquid crystal display (LCD) panel 101, a backlight module 102, and a camera assembly 103. The LCD panel 101 comprises an upper substrate 1013 and a liquid crystal layer 1014. A light transmissive portion 1012 is disposed in the liquid crystal layer 1014 in the light transmissive region 1011. Liquid crystals are disposed in the light transmissive portion 1012. Each pixel unit in the light transmissive region 1011 comprises liquid crystals, a pixel electrode, and a color resist. The pixel units in the light transmissive region 1011 cooperate with the camera assembly 103 to shoot images or not to shoot images. The pixel unit in the light transmissive region 1011 is connected to an independent driving circuit, the driving circuit is a thin film transistor (TFT) matrix. The driving circuit only controls rotation of the liquid crystals in the light transmissive portion 1012, and the driving circuit is independent from a driving circuit for driving the liquid crystals outside the light transmissive portion 1012. A lower substrate 1015 is disposed below the liquid crystal layer 1014, and a photosensitive element 1031 is disposed right under the lower substrate 1015 and the light transmissive portion 1012. The camera assembly 103 is disposed below the lower substrate 105. The camera assembly 103 comprises a photosensitive element 1031 and a light valve 1032. The photosensitive element 1031 is divided into two layers and comprises a photosensitive plate and an imaging element 10311. The photosensitive plate collects light reflected from an object, and then projects an image on the imaging element 10311 to obtain original shooting data. The light valve 1032 is embedded in an optical film 1021 in the backlight module 102, and a light source 1022 is arranged below the optical film 1021.

When the display device 100 is in the normal display mode instead of a camera mode, the light source 1022 emits light to pass through the optical film 1021 and is changed from linear light to a planar light. The planar light is transmitted into the display panel 101, and a display screen of the display panel 101 display images normally. The planar light passes through the light transmissive portion 1012 normally. At this time, the liquid crystals of the light transmissive portion 1012 are orientated in the same direction as the liquid crystals outside the light transmissive portion 1012.

Figure 3:
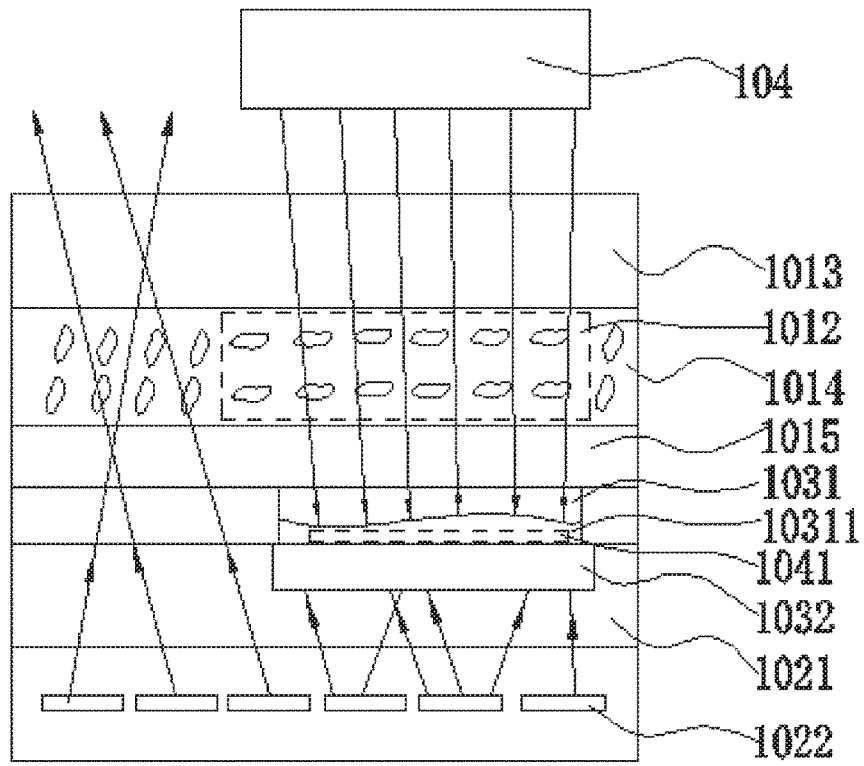
FIG. 3 is a schematic view illustrating light transmission of the display panel in a camera mode according to one embodiment of the present application.

Referring to FIG. 3, it is a schematic view illustrating light transmission of the display device 100 in the camera mode according to one embodiment of the present application. In the camera mode of the display device 100, the control terminal is switched on, the pixel units in the light transmissive region 1011 cooperate with the camera assembly 103 for shooting images. The light valve 1032 receives an electrical signal and immediately changes reflectance, absorption, and color, so the light cannot pass through the light valve 1032, and light under the light valve 1032 is absorbed or reflected back off the light valve 1032. At the same time, an independent driving circuit is connected to the liquid crystals in the light transmissive region 1012. The driving circuit controls the liquid crystals in the light transmissive portion 1012 to rotate to a predetermined angle, and allows light reflected from a surface of an object to be transmitted to the photosensitive plate in the photosensitive element 1031. Then, an optical image is formed on the imaging element 10311. During the shooting process, a rotation direction of the liquid crystals in the light transmissive region 1012 is different from a rotation direction of the liquid crystals outside the light transmissive region 1012. Light outside the light valve 1032 passes through the optical film 1021 normally, and the display screen of the display panel 101 displays images normally.

Figure 4:
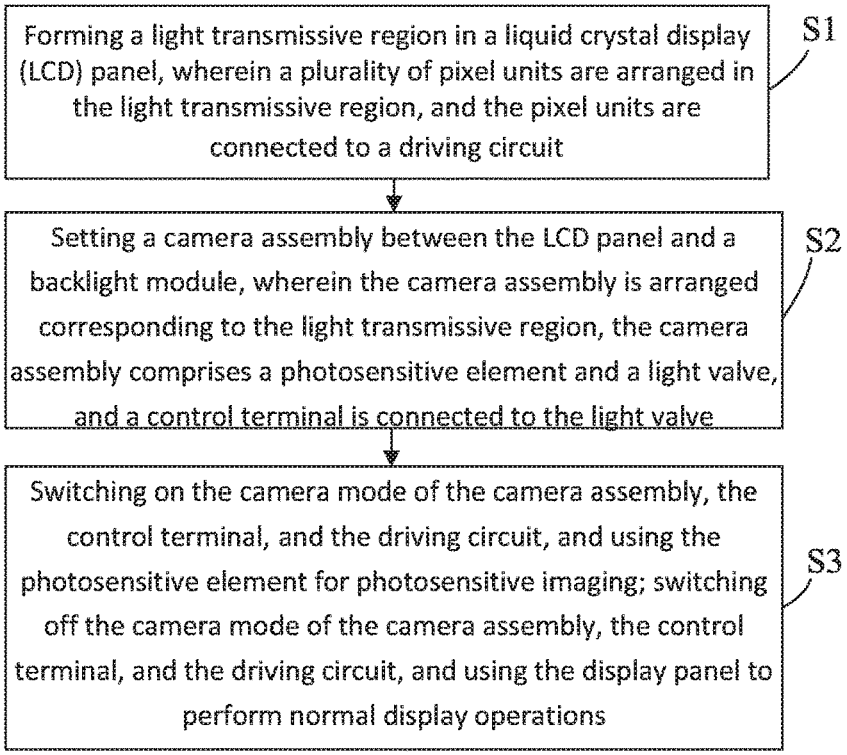
FIG. 4 is a process flow diagram illustrating a shooting method of the display panel according to one embodiment of the present application.

As shown in FIG. 4, the present application further provides a shooting method of a display device, comprising following steps:

step S1: forming a light transmissive region in a liquid crystal display (LCD) panel, wherein a plurality of pixel units are arranged in the light transmissive region, and the pixel units are connected to a driving circuit;

step S2: setting a camera assembly between the LCD panel and a backlight module, wherein the camera assembly is arranged corresponding to the light transmissive region, the camera assembly comprises a photosensitive element and a light valve, and a control terminal is connected to the light valve; and step S3: switching on the camera assembly, the control terminal, and the driving circuit, and using the photosensitive element for photosensitive imaging; switching off the camera assembly, the control terminal, and the driving circuit, and using the display panel to perform normal display operations.

In step S1 of forming the light transmissive region in the LCD panel, wherein the light transmissive region is provided with the pixel units, and the pixel units are connected to the driving circuit in, the shooting method further comprises:

switching on the driving circuit, so a plurality of liquid crystals in the pixel units allow entry of external light; and switching off the driving circuit, so the liquid crystals in the pixel units stops entry of the external light.

In step S2 of setting the camera assembly between the LCD panel and the backlight module, wherein the camera assembly is arranged corresponding to the light transmissive region, the camera assembly comprises the photosensitive element and the light valve, and the control terminal is connected to the light valve, the shooting method further comprises:

switching on the control terminal, so the light valve is connected to an electrical signal to immediately change reflectance, absorption, and color to stop light from passing through the light valve;

switching off the control terminal, so the light valve is disconnected from an electrical signal, and the light valve returns to a transparent state to allow light to pass through the light valve.

In step S3 of switching on the camera mode of the camera assembly, the control terminal, and the driving circuit, and using the photosensitive element for photosensitive imaging; switching off the camera mode of the camera assembly, the control terminal, and the driving circuit, and using the display panel to perform the normal display operations, the shooting method further comprises:

switching on or off the camera mode of the camera assembly, the control terminal, and the driving circuit at the same time;

wherein when the camera assembly is switched to a camera mode, light of the backlight module is stopped from passing through the light valve, and external light passes through the light transmissive region in the LCD panel and is transmitted to the photosensitive element for photosensitive imaging; and when the camera mode of the camera assembly is switched off, external light is stopped from passing through the light transmissive region in the LCD panel, and light of the backlight module passes through the light valve and is transmitted into the display panel for normal display operations.

In the present application, a camera assembly is disposed between an LCD panel and a backlight module. The LCD panel is provided with a light transmissive region, the light transmissive region comprises a plurality of pixel units arranged in an array, the camera assembly is disposed corresponding to the light transmissive region, the camera assembly comprises a photosensitive element and a light valve, and the light valve is disposed adjacent to the backlight module. The control terminal is connected to the light valve, and the control terminal provides an electrical signal to the light valve or disconnects the light valve from an electrical signal. When the camera assembly is switched to a camera mode, the light valve is in a light-shielding state, and light of the backlight module is stopped from passing through the light valve. The pixel units in the light transmissive region are in a light transmissive state, and the photosensitive element collects external image information through the light transmissive region for imaging. When the camera mode of the camera assembly is switched off, the light valve is in a light-transmissive state, light of the backlight module passes through the light valve to provide a backlight source for the light transmissive region, and the pixel units are lit by the backlight source to return to a normal display mode. Accordingly, camera-under-panel shooting and a full-screen design are realized, and a bezel-width problem of the display panel is completely solved.

In summary, although the present application has been disclosed above with preferable embodiments, the above embodiments are not intended to limit the present application. Those skilled in the art can make various modifications without departing from the spirit and scope of the present application. Therefore, the protection scope of this application is defined by the appended claims.

What is claimed is:
1. A display device, comprising:
a liquid crystal display (LCD) panel;
a backlight module disposed in back of the LCD panel; and
a camera assembly disposed between the LCD panel and the backlight module;

wherein the LCD panel is provided with a light transmissive region, the camera assembly is disposed corresponding to the light transmissive region, the camera assembly comprises a photosensitive element and a light valve, and the light valve is disposed adjacent to the backlight module, wherein the light valve comprises a glass substrate, and an electrochromic material is in the glass substrate.

2. The display device according to claim 1, wherein the electrochromic material is one or a combination of indium tin oxide and tungsten trioxide for controlling switching-on or switching-off of the light valve.

3. The display device according to claim 1, wherein a control terminal is connected to the light valve, and the control terminal sends an electrical signal to the light valve or disconnects the light valve from an electrical signal; when the camera assembly is switched to a camera mode, the light valve is in a light-shielding state, and light of the backlight module is stopped from passing through the light valve; when the camera mode of the camera assembly is switched off, the light valve is in a light-transmissive state, and the light of the backlight module passes through the light valve to provide a backlight source for the light transmissive region.

4. The display device according to claim 1, wherein the light transmissive region comprises a plurality of pixel units arranged in an array; when the camera assembly is switched to a camera mode, the pixel units in the light transmissive region are in a light transmissive state, and the photosensitive element collects external image information through the light transmissive region; when the camera mode of the camera assembly is switched off, the pixel units are lit by a backlight source to return to a normal display mode.

5. The display device according to claim 4, wherein a size of each pixel unit in the light transmissive region is smaller than a size of each pixel unit outside the light transmissive region, and a gap between the pixel units in the light transmissive region is larger than a gap between the pixel units outside the light transmissive region.

6. The display device according to claim 1, wherein a projection of the camera assembly projected on the light transmissive region is located in the light transmissive region.

7. A shooting method of a display device, comprising following steps:
   step S1: forming a light transmissive region in a liquid crystal display (LCD) panel, wherein a plurality of pixel units are arranged in the light transmissive region, and the pixel units are connected to a driving circuit;
   step S2: setting a camera assembly between the LCD panel and a backlight module, wherein the camera assembly is arranged corresponding to the light transmissive region, the camera assembly comprises a photosensitive element and a light valve, and a control terminal is connected to the light valve, wherein the light valve comprises a glass substrate, and an electrochromic material is in the glass substrate, the electrochromic material is one or a combination of indium tin oxide and tungsten trioxide for controlling switching-on or switching-off of the light valve; and
   step S3: switching on the camera mode of the camera assembly, the control terminal, and the driving circuit, and using the photosensitive element for photosensitive imaging; switching off the camera mode of the camera assembly, the control terminal, and the driving circuit, and using the display panel to perform normal display operations.

8. The shooting method of the display device according to claim 7, wherein in step S1 of forming the light transmissive region in the LCD panel, wherein the light transmissive region is provided with the pixel units, and the pixel units are connected to the driving circuit, the shooting method further comprises:
   switching on the driving circuit, so a plurality of liquid crystals in the pixel units allow entry of external light; and
   switching off the driving circuit, so the liquid crystals in the pixel units stops entry of the external light.

9. The shooting method of the display device according to claim 7, wherein in step S2 of setting the camera assembly between the LCD panel and the backlight module, wherein the camera assembly is arranged corresponding to the light transmissive region, the camera assembly comprises the photosensitive element and the light valve, and the control terminal is connected to the light valve, the shooting method further comprises:
   switching on the control terminal, so the light valve receives an electrical signal to immediately change reflectance, absorption, and color to stop light from passing through the light valve;
   switching off the control terminal, so the light valve is disconnected from an electrical signal, and the light valve returns to a transparent state to allow light to pass through the light valve.

10. The shooting method of the display device according to claim 7, wherein in step 3 of switching on the camera mode of the camera assembly, the control terminal, and the driving circuit, and using the photosensitive element for photosensitive imaging; switching off the camera mode of the camera assembly, the control terminal, and the driving circuit, and using the display panel to perform the normal display operations, the shooting method further comprises:
   switching on or off the camera mode of the camera assembly, the control terminal, and the driving circuit at the same time;
   wherein when the camera assembly is switched to the camera mode, light of the backlight module is stopped from passing through the light valve, and external light passes through the light transmissive region in the LCD panel and is transmitted to the photosensitive element for photosensitive imaging; and
   wherein when the camera mode of the camera assembly is switched off, the external light is stopped from passing through the light transmissive region in the LCD panel, and the light of the backlight module passes through the light valve and is transmitted to the display device for the normal display operations.

* * * * *